Oct. 16, 1956

W. B. GUGGI 2,767,365

MOTOR CONTROL SYSTEM

Filed May 6, 1955

WITNESSES
Edwin E. Bassler
John B. Davidson

INVENTOR
Walter B. Guggi
BY
Paul E. Friedemann
ATTORNEY

United States Patent Office 2,767,365
Patented Oct. 16, 1956

2,767,365

MOTOR CONTROL SYSTEM

Walter B. Guggi, Snyder, N. Y., assignor to Westinghouse Electric Corporation, East Pittsburgh, Pa., a corporation of Pennsylvania Application May 6, 1955, Serial No. 506,474

7 Claims. (Cl. 318—327)

My invention relates generally to motor control systems and, more particularly, to motor control systems wherein junction transistors are utilized as control elements.

In the prior art there are many systems for controlling and regulating the speed of an electric motor which require auxiliary control apparatus of more or less circuit complexity and which vary considerably in the preciseness of the control achieved thereby. As the preciseness and accuracy of the control is increased, almost inevitably the complexity of the required control equipment likewise increases in proportion. To reduce the complexity and cost of the control apparatus and to lessen the frequency and difficulty of maintenance thereof, it is desirable that the apparatus be kept as simple as possible and that the components be as rugged and trouble-free as possible.

One object of my invention is to provide a motor control system having a minimum of circuit complexity which will precisely and accurately control the operation of the motor and its associated driven equipment.

Another object is to provide a precise and accurate motor control system utilizing simple, rugged component parts.

Still another object is to provide a motor control system having improved operating characteristics, particularly with regard to temperature stability, with a minimum of circuit complexity.

A further object is to provide a motor control system utilizing junction transistors as primary control elements wherein standard apparatus may be utilized to match transistor characteristics without the necessity for special design or modification thereof.

A still further object is to provide a motor control system utilizing junction transistors as primary control elements wherein the magnitude of the supply voltage for the motor may be selected at any value without regard to the voltage limitations of the primary control element.

According to one feature of my invention, the field winding of a direct current motor is energized from an alternating current source by means of a circuit including two transformers, the center-tapped output winding of one of which is energized to the center-tapped primary of the other by means of single phase rectifiers forming the outer terminals and a junction transistor connecting the center taps through the emitter-to-collector current conduction path thereof. The output winding of the second transformer energizes the motor field through a rectifier so as to supply direct current thereto.

The two rectifiers interposed between the transformers are poled so that current flows therethrough in alternation, the return circuit to the center-tapped primary being through the transistor. By switching the transistor alternately between cutoff and full conduction, the average current to the center-tapped primary is controlled and the average current energizing the motor field is varied. The speed of the motor is regulated by providing a control loop whereby voltage pulses applied to the transistor to control the time duration of the current pulses therefrom are pulse width modulated function of motor speed.

Other objects and features of my invention will become apparent upon consideration of the following description thereof when taken in conjunction with the accompanying drawing, wherein.

Figure 1:
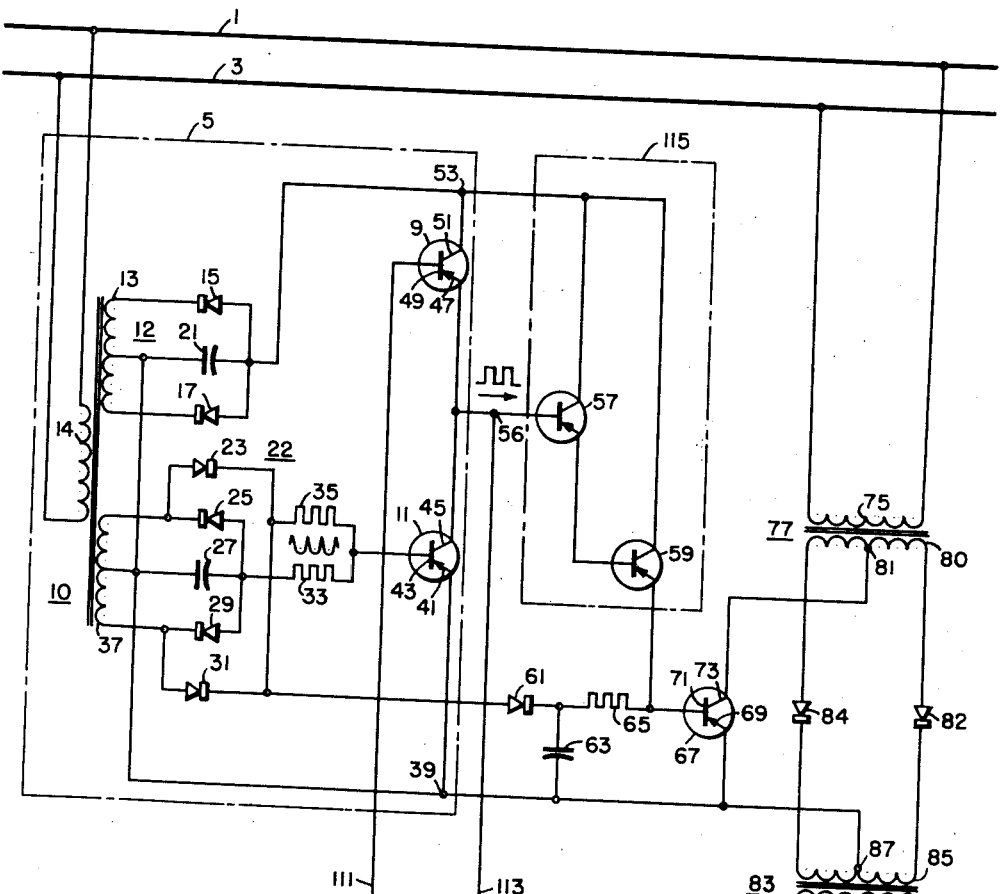
Figure 1 is a schematic diagram of an embodiment of my invention.

With reference now to the embodiment shown in Fig. 1, there is provided for the energization of separately excited field 97 of motor M a circuit including transformer 77 having a center-tapped secondary 80, transformer 83 having a center-tapped primary 87, and a full-wave rectifier 94 including single phase rectifiers 93 and 95. The primary 75 of transformer 77 is energized from alternating current buses 1 and 3. The outer terminals of secondary winding 80 of transformer 77 are connected to the outer terminals of the primary 85 of transformer 83 by means of single phase rectifiers 82 and 84, which rectifiers are poled so that current will flow from secondary winding 80 to primary winding 85 and also so as to oppose current flow from each other. A return path for current flowing through rectifiers 82 and 84 is provided from center tap 87 of primary winding 85 to center tap 81 of primary winding 80 through the emitter-to-collector current conduction path of transistor 67. Transistor 67 is shown as a p-n-p type junction transistor although n-p-n- type transistors may be substituted therefor. The emitter 69 and collector 73 of transistor 67 are respectively connected to center taps 87 and 81.

Single phase rectifiers 93 and 95 couple secondary winding 91 of transformer 83 to separately excited field winding 97 of motor M, one terminal of winding 97 being connected to the center tap of secondary winding 91.

Transistor 67 is operated in switching service so that collector current is either cut off or at saturation. Preferably, the transistor is normally biased to cut off and pulses are applied between base and emitter to drive the collector current to saturation so that the impedance between emitter and collector of the transistor varies between an impedance of the order of several hundred thousand ohms and an impedance of less than two ohms when a fused junction transistor is used. Likewise, the pulses preferably have a constant repetition rate, the average current through the transistor being varied by controlling the duty cycle of the pulses in accordance with the desired control effect upon motor speed.

Pulses for biasing transistor 67 to full conduction are preferably derived from a pulse source. A suitable pulse source for this purpose is illustrated in my copending application Serial No. 502,470, filed April 19, 1955 for "Voltage to Pulse-Width Conversion Device." The duty cycle of the output pulses of this modulator is variable in accordance with the magnitude of a control voltage coupled thereto. As shown, the pulse width modulator comprises two constant current devices which are depicted as junction transistors 9 and 11, the emitter-to-collector current conduction paths of which are serially connected across a direct current source 12. A source of saw tooth voltage of generally triangular wave-form 22 has its output circuit coupled between base 43 and emitter 41 of transistor 11. The source of control voltage, which will be described below, has its output voltage coupled between emitter 47 and base 49 of transistor 9. The output terminals 56 and 39 are connected directly to emitter 41 and collector 45, respectively, of transistor 11.

Normal bias for transistor 67 to bias the transistor to cut off is derived from alternating current lines 1 and 3 through transformer 10, rectifiers 23, 31, and a filter network comprising capacitor 63 and resistor 65. Control voltage for application between emitter 47 and base 49 is derived from the output lines 111 and 113 of resistive mixer 107. This device compares the magnitudes of the voltages derived from a reference voltage source 109 and from the armature 103 of a tachometer generator TG and provides an output voltage across lines 111 and 113, the magnitude of which is equal to the difference in the magnitudes of the output voltages from the reference voltage source 109 and the tachometer generator 107. The tachometer generator is driven from the output shaft of motor M and provides a voltage the magnitude of which is either proportional or functionally related to the speed of motor M. The separately excited field 105 of tachometer generator TG is excited from any convenient source of direct current. Alternatively, a permanent magnet may be utilized to provide the magnetic field for the tachometer. The reference voltage source 109 may be any device that supplies a controllable direct voltage. Resistive mixer 107 is any device well known to the art which will compare two voltages and will provide an output voltage equal to the sum of the magnitudes thereof. A suitable resistive mixer may be found in my copending application Serial No. 506,473, filed May 6, 1955 for a "Motor Control System." In the instant application, the voltages to be compared are differentially coupled to the resistive mixer so that the output voltage is equal in magnitude to the difference between the magnitudes of the two voltages.

The output pulses from pulse source 5 are derived across transistor 11 and are applied between base 71 and emitter 69 by means of a cascaded preamplifier 115 utilizing transistors 57 and 59. The cascaded preamplifier is of the type described in the copending application of R. A. Jacobs, Jr., Serial No. 487,887 for "Transistor Amplifier" filed February 14, 1955. The advantage of using this particular type of amplifier is that it inherently introduces a large amount of feedback which provides maximum stability within the system.

In describing the operation of my invention, it will be assumed that the motor is initially at rest and that a source of direct current has been connected to the armature 99 of the motor. Tachometer generator TG will supply no voltage to the resistive mixer and the voltage across lines 111 and 113 will be essentially the same voltage as that supplied to the mixer by reference voltage source 109. Either there will be no output pulses supplied from source 5 or the duty cycle of the output pulses will be at a minimum value so that transistor 67 will be either biased to cut off at all times or a minimum average current will flow therethrough. Field winding 97 will be energized with minimum weak field current and will accelerate. As the motor accelerates, the voltage across armature 107 of tachometer generator TG will build up, the voltage across lines 111 and 113 will decrease and reverse polarity, when tachometer voltage surpasses reference voltage, the duty cycle of the output pulses from source 5 will increase and transistor 67 will be biased to full conduction by the aforesaid output pulses from source 5 so that the average current therethrough will progressively increase. The field current supplied to field winding 97 will likewise increase, thus decreasing the rate at which the motor accelerates.

In due course, the motor will reach an operating speed determined by the magnitude of the reference voltage source 109. At this speed the output pulses from source 5 will have a duty cycle such that the average current flowing through field winding 97 will no longer tend to accelerate motor M. It has been found that there will be very little hunting due to amplifier time delay about the desired operating speed of the motor inasmuch as the circuit elements have extremely short time delay and the entire system responds very quickly to changes in motor speed such, for example, as are brought about by an increase or a decrease in the load thereon. For example, an increase in the magnitude of the load imposed on motor M will drop the rotational speed of the motor and decrease the magnitude of the output of tachometer generator 103. The magnitude of the potential difference across lines 111 and 113 will decrease since voltage between lines 111 and 113 is now reversed and tachometer outage is higher than reference voltage thereby decreasing the magnitude of the duty cycle of the output pulses from pulse source 5. Since the pulse width of the pulses applied between emitter 69 and base 71 is decreased, the average emitter current flowing through transistor 67 will likewise decrease thereby supplying less field current to field winding 97 and restoring the motor speed to its regulated value.

Figure 2:
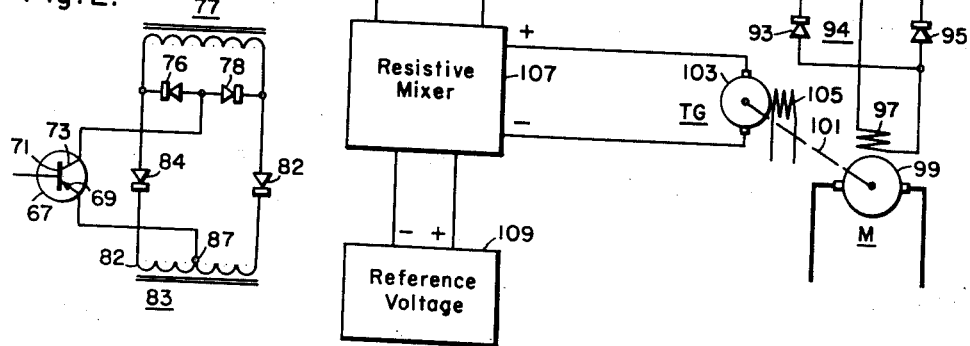
Fig. 2 is a partial schematic diagram illustrating another embodiment of my invention.

In Fig. 2, there is illustrated a second embodiment of my invention which is especially adapted for use where it is either not desirable or not feasible to center-tap the secondary of transformer 77. In this embodiment, emitter 73 of transistors 67 is connected to the anodes of half-wave rectifiers 76 and 78, the cathodes of the rectifiers being connected to the anodes of rectifiers 84 and 82, respectively. The four rectifiers 76, 78, 84 and 82 in effect serve as a bridge rectifier with the two halves of the primary winding 82 of transformer 83 in two legs thereof and the transistor 67 coupled across the bridge rectifier output. The transistor functions to control power flow to the primary winding 82 in the same manner as described above with reference to Fig. 1.

The invention is not to be restricted to the specific structural details, arrangement of parts, or circuit connections herein set forth, as various modifications thereof may be effected without departing from the spirit and scope of this invention.

I claim as my invention:

1. In combination: a source of alternating current; first transformer means having a first primary winding and a center-tapped secondary winding, second transformer means having a secondary winding and a center-tapped primary winding, said first primary winding being connected to said current source for energization thereby, the outer terminals of said center-tapped secondary winding being connected to the outer terminals of said center-tapped primary winding by half wave rectifier means connected to permit energy transfer from said center-tapped secondary winding to said center-tapped primary winding upon closure of a circuit between said center taps, junction transistor means having at least emitter, base and collector electrodes, said emitter and collector electrodes being connected between said center taps to provide a current conduction path therebetween, means coupled between said base and emitter electrodes adapted to bias said transistor between collector current cut off and saturation in alternation, and load means coupled to said secondary winding of said second transformer.

2. Apparatus for effecting a controllable transfer of power from an alternating current source to a load, comprising first means coupled to said current source having a three terminal, balanced output including a neutral terminal, second means having a three terminal, balanced input circuit including a neutral terminal and an output circuit coupled to said load; junction transistor means having at least emitter, base, and collector electrodes for coupling said neutral terminals together through the emitter-to-collector current conduction path thereof; first and second unilateral conduction means coupling the other output terminals of said first means to the other input terminals of said second means and polarized to oppose current flow from each other and to aid current conduction through said transistor means, and means coupled to said base electrode and one of said emitter and collector electrodes for controllably biasing said transistor-to-collector current cut off and collector current saturation.

3. Apparatus for effecting a controllable transfer of power from an alternating current source to a load, comprising first means coupled to said current source having a three terminal, balanced output circuit including a neutral terminal; second means having a three terminal balanced input circuit including a neutral terminal, and an output circuit coupled to said load; switch means for coupling said neutral terminals together responsive to a control signal coupled thereto; first and second unilateral conduction means coupling the other output terminals of said first means to the other input terminals of said second means.

4. A motor control system for a motor having a field winding for controlling the speed thereof, comprising: a source of alternating current; a transformer having a center-tapped primary; full-wave rectifier means coupling the output of said transformer to said field winding, means coupling said current source to said transformer primary including rectifier means for alternately and oppositely energizing the halves of said transformer primary winding and transistor means connected to said center tap of said transformer for controlling current flow through said rectifiers, said transistor means having at least emitter, base and collector electrodes; first means coupled between said base and emitter electrodes adapted to drive the collector current of said transistor means alternately between cut off and saturation; and means coupled to said first means adapted to pulse modulate said first means so as to vary the average collector current of said transistor means as a direct function of said motor speed.

5. A motor control system for a motor having a field winding for controlling the speed thereof, comprising: a source of alternating current; a transformer having a center-tapped primary; full-wave rectifier means coupling the output of said transformer to said field winding, means coupling said current source to said transformer primary including rectifier means for alternately and oppositely energizing the halves of said transformer primary winding and transistor means connected to said center tap of said transformer for controlling current flow through said rectifiers, said transistor means having at least emitter, base and collector electrodes; first means coupled between base and emitter electrodes adapted to drive the collector current of said transistor means alternately between cut off and saturation; second means coupled to said motor adapted to derive a signal having a characteristic variable directly in accordance with the speed of said motor; third means adapted to derive a signal having an output characteristic of adjustable magnitude; and fourth means coupled to said second and third means adapted to derive an output signal, the magnitude of a characteristic of which is variable in accordance with the difference of the magnitudes of said characteristics of said second and third means, said output signal being coupled to said first means to pulse modulate said first means so as to vary the average collector current of said transistor as an inverse function of said motor speed.

6. A motor control circuit for a motor having a field winding for controlling the speed thereof, comprising: a source of alternating current, a first transformer having a primary and a center-tapped secondary and a second transformer having a center-tapped primary and a secondary; means coupling said transformers in tandem between said source of alternating current and said field winding, said means including transistor means having at least emitter, base, and collector electrodes coupling the center tap of said first transformer secondary to the center tap of said second transformer primary through the emitter-to-collector current conduction path thereof and full-wave rectifier means coupling the other terminals of said first transformer secondary to the other terminals of said second transformer primary; pulse generating means coupled to said emitter and collector electrodes adapted to drive the collector current of said transistor alternately between cut off and saturation, and pulse modulating means coupled to said pulse generating means adapted to vary the average collector current of said transistor as a direct function of said motor speed.

7. A motor control circuit for a motor having a field winding for controlling the speed thereof, comprising: a source of alternating current, a first transformer having a primary and a center-tapped secondary and a second transformer having a center-tapped primary and a secondary; means coupling said transformers in tandem between said source of alternating current and said field winding, means including transistor means having at least emitter, base, and collector electrodes coupling the center tap of said first transformer secondary to the center tap of said second transformer primary through the emitter-to-collector current conduction path thereof and full-wave rectifier means coupling the other terminals of said first transformer secondary to the other terminals of said second transformer primary; pulse generating means coupled to said emitter and collector electrodes adapted to drive the collector current of said transistor alternately between cut off and saturation, pulse generating means coupled between base and emitter electrodes adapted to drive the collector current of said transistor means alternately between cut off and saturation; second means coupled to said motor adapted to derive a signal having a characteristic variable directly in accordance with the speed of said motor; third means adapted to derive a signal having an output characteristic of adjustable magnitude; and fourth means coupled to said second and third means adapted to derive an output signal, the magnitude of a characteristic of which is variable in accordance with the difference of the magnitudes of said characteristics of said second and third means, said output signal being coupled to said first means to pulse modulate said first means so as to vary the average collector current of said transistor as an inverse function of said motor speed.

No references cited.